United States Patent [19]

Huber

[11] 4,186,159
[45] Jan. 29, 1980

[54] PACKING ELEMENT OF FOIL-LIKE MATERIAL FOR AN EXCHANGE COLUMN

[75] Inventor: Max Huber, Winterthur, Switzerland

[73] Assignee: Sulzer Brothers Limited, Winterthur, Switzerland

[21] Appl. No.: 845,785

[22] Filed: Oct. 26, 1977

[30] Foreign Application Priority Data

May 12, 1977 [CH] Switzerland ............... 5949/77

[51] Int. Cl.² .......................................... B01F 3/04
[52] U.S. Cl. ............................. 261/112; 165/166; 261/DIG. 72
[58] Field of Search ...................... 261/94–98, 261/112, 113, DIG. 72, 79 A, DIG. 11; 55/240, 241; 165/166, 60; 210/150, 151; 202/158; 156/205, 210; 428/178, 182, 184, 186

[56] References Cited

U.S. PATENT DOCUMENTS

| 899,899 | 9/1908 | Peterson | 261/DIG. 72 |
| 2,615,832 | 10/1952 | Dixon | 261/DIG. 72 |
| 2,911,056 | 11/1959 | Edel | 261/112 X |
| 2,940,736 | 6/1960 | Odman | 261/112 X |
| 3,285,587 | 11/1966 | Huber | 261/112 X |
| 3,286,999 | 11/1966 | Takeda | 261/112 X |
| 3,415,502 | 12/1968 | Munters | 261/DIG. 11 |
| 3,618,778 | 11/1971 | Benton et al. | 210/150 |
| 3,704,869 | 12/1972 | Priestley | 55/241 X |
| 3,785,620 | 1/1974 | Huber | 261/112 X |
| 3,862,280 | 1/1975 | Polovina | 261/112 |
| 3,952,077 | 4/1976 | Wigley | 261/79 A X |

FOREIGN PATENT DOCUMENTS 1253673 11/1967 Fed. Rep. of Germany ... 261/DIG. 72

*Primary Examiner*—Richard L. Chiesa
*Attorney, Agent, or Firm*—Kenyon & Kenyon

[57] ABSTRACT

The packing elements are made of a strip of foil-like material which has at least one trickle surface for a descending flow of liquid. This surface is provided with alternating smooth portions and finely-fluted portions which extend over a height of at least five millimeters. In addition, at least the smooth portions are perforated. The packing element may be formed of a plurality of flat corrugated plates, or may be spirally wound from a continuous strip to form an ordered packing or may be in the form of cylinders to form a random packing.

8 Claims, 10 Drawing Figures

PACKING ELEMENT OF FOIL-LIKE MATERIAL FOR AN EXCHANGE COLUMN

This invention relates to a corrugated foil-like material for a packing element. More particularly, this invention relates to a packing element for exchange columns.

As is known, various types of packing elements have been used in exchange columns in which a gas and a liquid come into contact with another, for example in countercurrent. These packings can be in a random form, such as in the form of a large number of identical bulk packing elements, such as Raschig rings, or can be made of an ordered structure. Packings of ordered structure are generally referred to as "ordered" packings.

In many cases, the packing elements have been made of knitted or woven materials so as to provide a capillary effect for a descending flow of liquid. In other cases, the packing elements have been made of a foil-like material, such as sheet metal, in order to reduce the cost of construction. However, a uniform distribution of the liquid over the surface of a strip of foil-like material does not usually occur since capillary forces do not come into operation.

When the packing elements are made with corrugated surfaces, the descending liquid flows mainly along the tops of the corrugations, or folds, i.e. the liquid is channelled, and does not trickle uniformly over the trickle surfaces of the packing element.

Further, in many of the previously known packing elements, the mass transfer or heat exchange rate has not been as efficient as possible.

Accordingly, it is an object of the invention to accelerate the mass transfer and heat exchange in a packing element made of foil-like material.

It is another object of the invention to increase the efficiency of a packing element made of foil-like material.

Briefly, the invention provides a foil-like material for a packing element which has at least one trickle surface for a descending flow of liquid which is provided with alternating smooth portions and finely fluted portions; the individual portions extending over a height of at least five millimeters.

The term "finely fluted" or "fluting" as used herein is to be understood as a roughening of the surface of the packing material by means of grooves or by means of an impressed pattern such as a herringbone pattern in order to laterally distribute a liquid under capillary action.

The foil-like material may be used to make packing elements having an ordered structure. In this case, the smooth (or plain) and finely-fluted portions are disposed alternately in the direction of the fall line of the liquid on the surfaces of the material. When the packing element is formed of a plurality of corrugated plates of the foil-like materail so as to be disposed within an exchange column in parallel to the column axis, and when the fine fluting is in the form of grooves, the grooves are disposed to form an angle with the column axis of opposite sign to the corresponding angle of the corrugations of the plates.

The fine fluting, if in the form of grooves, can extend horizontally. Advantageously, however, the angle between the fine grooves and the column axis is from 15° to 90° and the corresponding angle between the corrugations and the column axis is in the region of approximately 15° to 60°. In the latter case, the tendency of the liquid to spread out laterally over the trickle surfaces is further increased by the force of gravity which is operative in the troughs.

In the various types of packings in which the foil-like material is used, the following phenomena occur. The liquid flows down the trickle surfaces in the form of a film and mass transfer or heat exchange occurs as a result of diffusion from a gas phase into the liquid film and vice versa.

These phenomena occur in accordance with the two film theory. In accordance with this theory, the time taken by a molecule to go from the core of the gas flow to the core of the liquid consists of two steps. In a first step, the molecule passes from the core or center of the gas flow to the phase boundary. In the second step, the molecule passes from the phase boundary to the core of the liquid.

The packing material of the invention accelerates the second step considerably. To this end, the liquid film is much thicker on the finely fluted portions of the trickle surfaces and on the smooth portions. Often, instead of a film forming on the plain portions, a channelled flow occurs. When the liquid is transferred from one portion to the other, the film thickness alters and a new liquid surface forms. Particles then pass from the core or central flow of the liquid to the surface and vice versa. This mechanical motion is much faster than molecular movement caused by diffusion. Consequently, differences in concentration and temperature are evened out not just by diffusion alone but also by rapid motion of the discrete liquid particles relative to one another. This results in an improvement in the mass transfer or heat exchange.

These and other objects and advantages of the invention will become more apparent from the following detailed description and appended claims taken in conjunction with the accompanying drawings in which:

Figure 1:
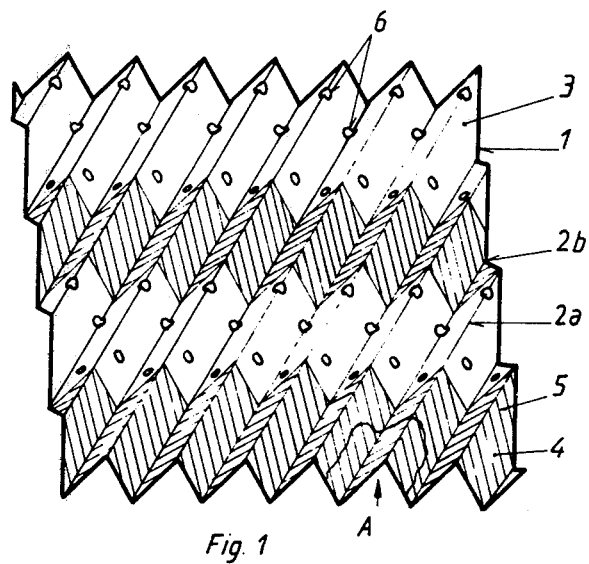
FIG. 1 illustrates a perspective view of a corrugated foil-like material plate made in accordance with the invention.
Figure 1A:
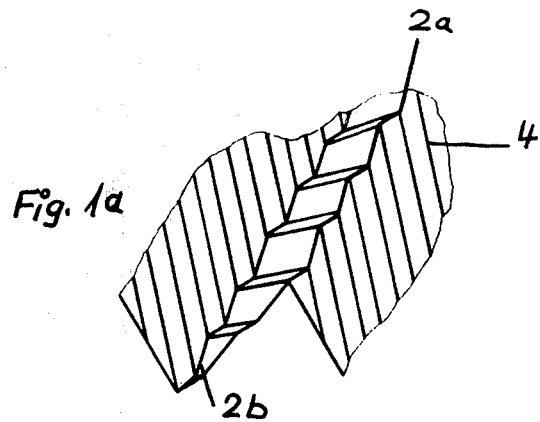
FIG. 1a illustrates a detail of FIG. 1 to an enlarged scale.

Referring to FIG. 1, a plate 1 of corrugated foil-like material which is to be used in a packing element has front and back trickle surfaces on which a descending flow of liquid may form. As shown in FIG. 1, the front trickle surface has a cross corrugation or folding made up of crests 2a, and troughs 2b. The term "folding or corrugation" is to be understood herein as defining a shape having sharp edges and a shape having curvilinear edges.

The plate may be formed of metal, for example, copper, stainless steel, or Monel metal, or of a plastics. In addition, the plate 1 is subdivided perpendicularly with respect to the column axis in which the plate would be placed into alternating discrete plain or smooth portions 3 and finely fluted portions 4. As indicated, the smooth portions 3 and finely fluted portions 4 are transverse to the corrugations. The fluting is formed by fine grooves or flutes 5 which are disposed at an angle of opposite side to the angle of inclination of the corrugations of the plate 1. The fluting length and height are of the order from 0.3 to 3 millimeters. Advantageously, the angle between the fine fluting and the column axis is 15° to 90° and the corresponding angle between the corrugations and the column axis is between 15° and 60°; the former angle being of opposite sign to the latter angle.

As shown, the smooth portions are perforated with a number of apertures 6. These apertures 6 have a diameter of the order of approximately 4 millimeters and take up a maximum of 5 to 20% of the total trickle surface.

Figure 2:
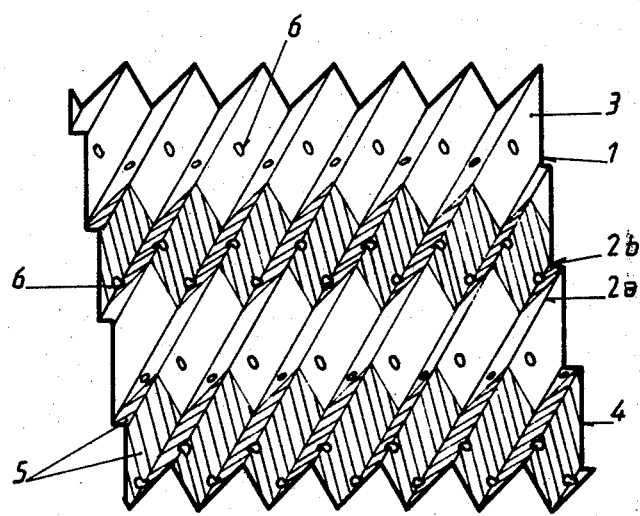
FIG. 2 illustrates a modification of the corrugated plate of FIG. 1.

Referring to FIG. 2, wherein like reference characters indicate like parts as above, the plate may also be formed with apertures 6 within the finely fluted portions 4.

Figure 3:
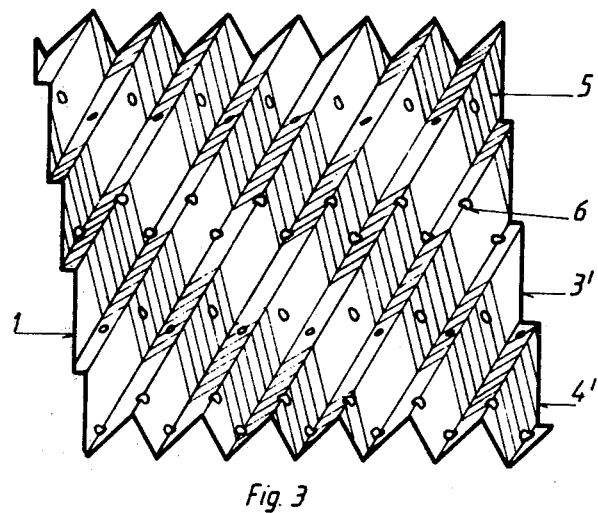
FIG. 3 illustrates a further modification of the corrugated plate of FIG. 1.

Referring to FIG. 3, wherein like reference characters indicate like parts as above, the finely fluted portions 4' may be disposed at an angle to the column axis in which the plates are placed rather than being disposed perpendicularly to the column axis.

Figures 4, 4A:
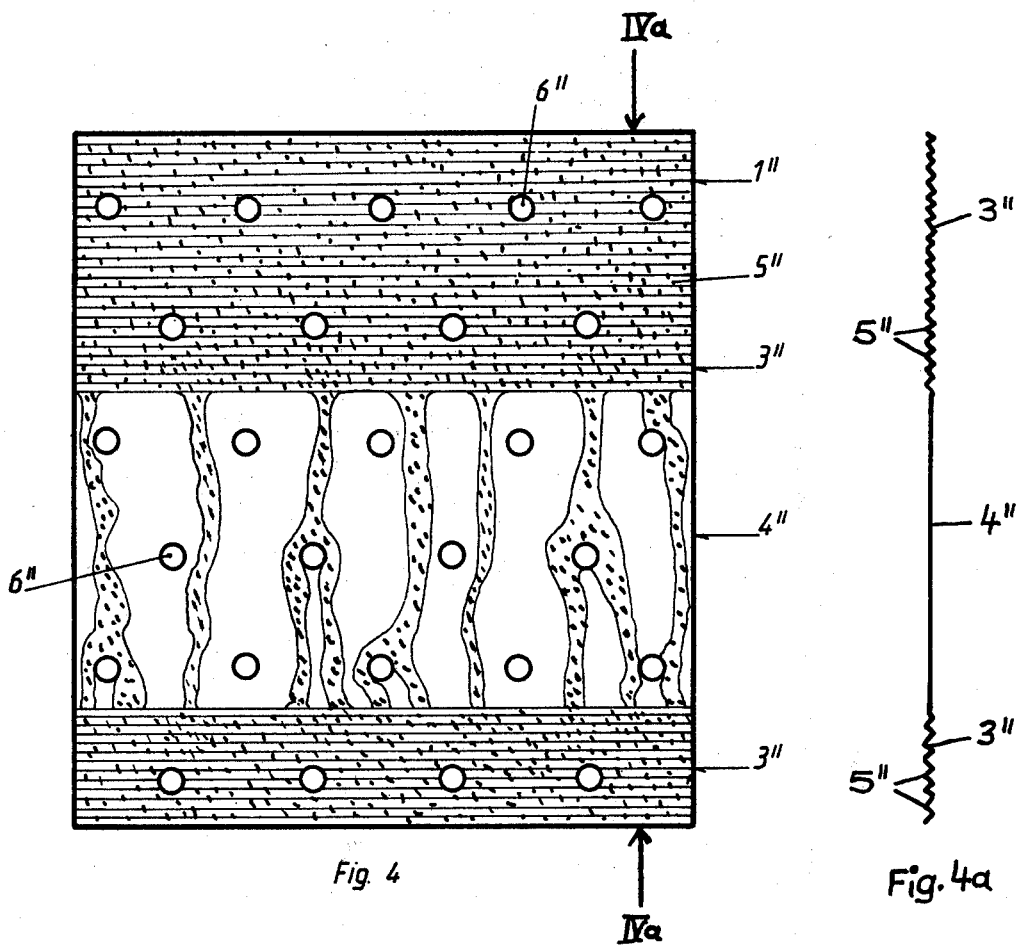
FIG. 4 illustrates a diagrammatic view of a flow band for a developed trickle surface.
FIG. 4a illustrates a view in side elevation taken on line IVa—IVa of FIG. 4.

Referring to FIG. 4, wherein the plate 1 is shown with a developed trickle surface 1", during operation, a descending liquid descends on the uppermost finely-fluted portion 3" and spreads laterally. When entering the smooth portion 4", the liquid often forms channels or rivulets which descend to the next finely fluted portion 3". During this time, various rivulets are deflected laterally about intercepted apertures 6". Upon reaching the lower finely-fluted portion 3", the liquid again forms a film.

Figure 5:
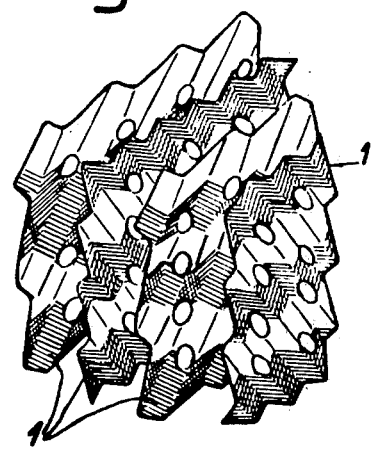
FIG. 5 illustrates a plurality of corrugated plates for use in a packing element in accordance with the invention.

Referring to FIG. 5, a plurality of plates 1 as described above with respect to FIGS. 1 to 3, can be stacked together in contacting relation or can be spaced apart by flat sheets so as to form individual packing units. As such, the packing units can then be introduced into an exchange or transfer section 15 (FIG. 8) of a cylindrical column. As noted above, the packing element can be built up from parallel unfolded or uncorrugated plates with adjacent layers being spaced apart from one another by spacers.

Figure 6:
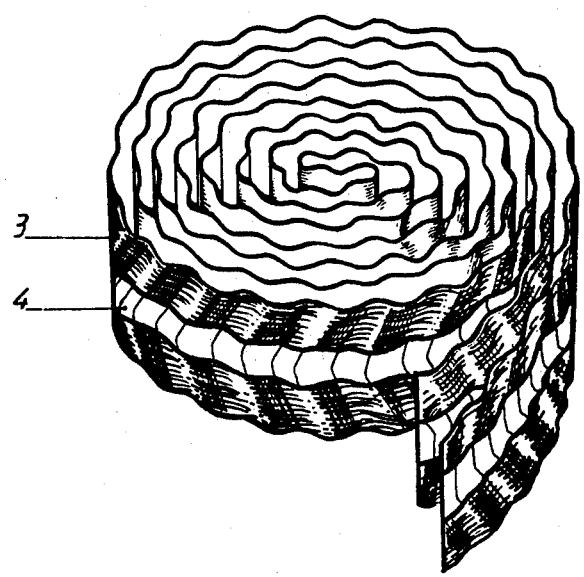
FIG. 6 illustrates a corrugated strip of foil-like material coiled in a spiral form in accordance with the invention.

Referring to FIG. 6, the foil-like material may also be in the form of a spiral-wound shape. In this case, the material or strip can also be folded in a herringbone fashion. As above, the surfaces of the rolled strip are subdivided into fine fluted portions 3 and plain portions 4. The roll can also take the form of an uncorrugated strip with adjacent convolutions or layers being spaced apart from one another in known manner by spacers.

Figure 7:
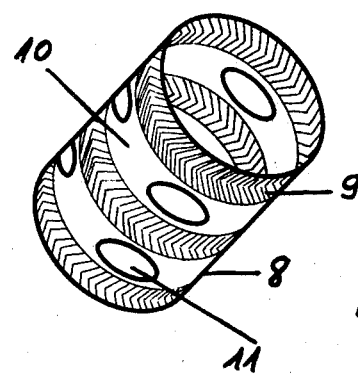
FIG. 7 illustrates a cylinder of the foil-like material of the invention.

Referring to FIG. 7, the foil-like material may, alternatively, be made as a random packing element for use in a column having random packings. To this end, the material may be used to form a Raschig ring-type packing 8 having finely fluted annular portions 9 and smooth annular portions 10. In addition, the smooth portions 10 are formed with apertures 11. A packing of this kind is generally used in columns where the mass or heat exchange section contains a bulk filling of such packings. Also, the packing element can be of any other known type for random bulk fill packing such as saddles, webbed rings and so on.

Figure 8:
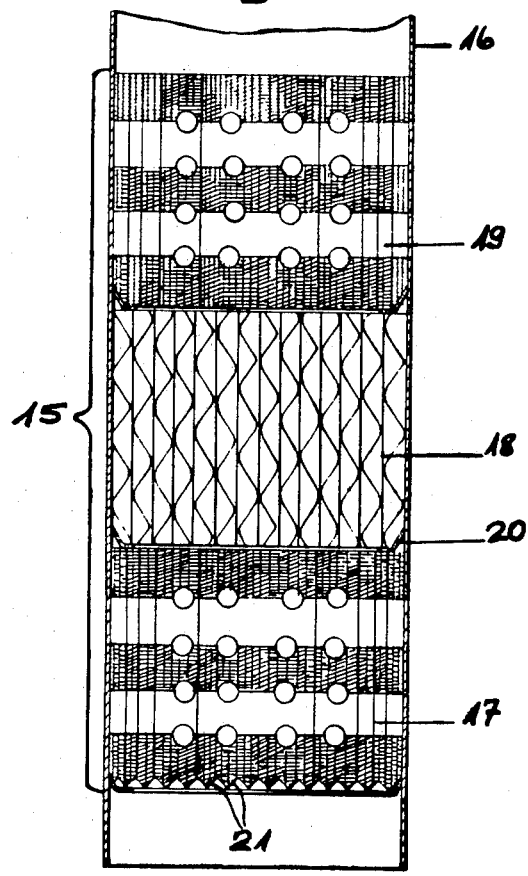
FIG. 8 illustrates a part of a column having three packing elements of the type indicated in FIG. 5 therein.

Referring to FIG. 8, the packing elements 17, 18, 19 can be disposed within the column 16 at 90° offset angles from each other. Further, the elements 17, 18, 19 may be provided at the bottom with collar-like deflector elements 20 which seal the annular gap between the packings and the column wall to cause an inward deflection of liquid descending the inside walls along the bottom of each packing element. Collars of this kind can also be provided at various heights for packing elements.

In order to ensure that the liquid is deflected in a uniformly distributed manner over the column cross-section into the column evaporator parts disposed below the bottommost packing element, the plates of the bottom packing element 17 terminate at the bottom in serrated edges 21.

Alternatively, the packing elements such as illustrated in FIGS. 6 and 7 may also be used in the column 16.

In the case of columns having diameters of, for example one meter or more, the packing elements can be in the form of a number of parts which are disposed one beside the other. In this case, the discrete parts can be held together by the column wall.

What is claimed is:

1. A packing element for an exchange column comprising
a plurality of vertically disposed corrugated plates of foil-like material each having a longitudinal axis disposed in contacting parallel relation and parallel to said axis, each plate having corrugations disposed at an angle to the corrugations of an adjacent plate, each said plate forming a surface for receiving a descending flow of liquid thereon, said surface being sub-divided perpendicularly of said axis to have alternating smooth portions extending transverse to said corrugations and finely-fluted portions extending transverse to said corrugations, said finely-fluted portions being laterally disposed to laterally distribute the liquid under capillary action.

2. A packing element as set forth in claim 1 wherein said plates are perforated at least in said smooth portions.

3. A packing element as set forth in claim 1 wherein said finely-fluted portions contain from one to ten flutes per three millimeters of plate height.

4. A packing element as set forth in claim 1 wherein said finely-fluted portions are grooved.

5. A packing element as set forth in claim 4 wherein said grooves of each plate are disposed at an angle of opposite sign from said corrugations thereof.

6. A packing element as set forth in claim 1 wherein said portions are alternately disposed in the direction of the fall line of a descending flow of liquid.

7. A packing element as set forth in claim 1 wherein said portions have a height of at least five millimeters.

8. In combination with an exchange column having a longitudinal axis,
at least one packing element in said column, said packing element including a plurality of vertically disposed corrugated plates of foil-like material disposed parallel to said axis and in contacting relation, each said plate having corrugations disposed at an angle to the corrugations of an adjacent plate, each said plate forming a surface for receiving a descending flow of liquid thereon, said surface being sub-divided perpendicularly of said axis to have alternating smooth portions extending transverse to said corrugations and finely-fluted portions extending transverse to said corrugations, said finely fluted portions being laterally disposed to laterally distribute the liquid under capillary action.

* * * * *